H. H. MALLORY.
ATOMIZER.
APPLICATION FILED APR. 27, 1908.
No. 905,087.
Patented Nov. 24, 1908.
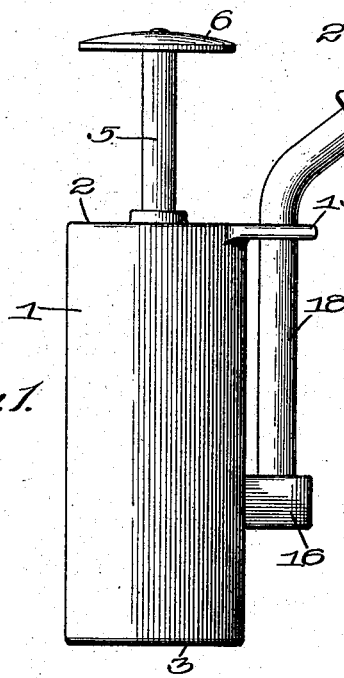
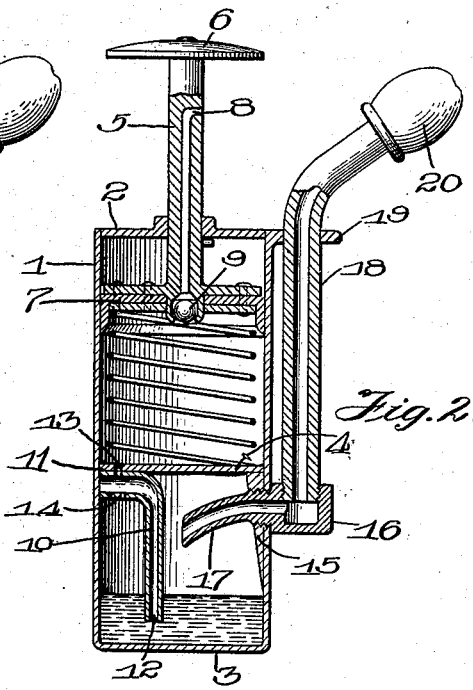
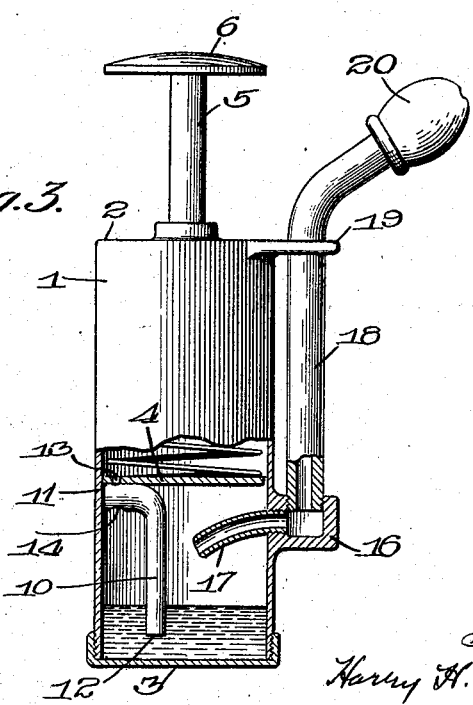
Witnesses:
Inventor:
Harry H. Mallory

UNITED STATES PATENT OFFICE.

HARRY H. MALLORY, OF CHICAGO, ILLINOIS.

ATOMIZER.

No. 905,087.  Specification of Letters Patent.  Patented Nov. 24, 1908.

Application filed April 27, 1908. Serial No. 429,465.

*To all whom it may concern:*

Be it known that I, HARRY H. MALLORY, a citizen of the United States, residing at Chicago, in the county of Cook and State of Illinois, have invented a new and useful Atomizer, of which the following is a specification.

My invention relates to improvements in atomizers, particularly small atomizers for use in spraying medicaments or perfumes, and the objects of my improvement are to provide a small compact atomizer of strong and simple construction adapted to be easily filled, easily cleaned and to be conveniently carried in the pocket.

In the drawings Figure 1 is a perspective view of my invention. Fig. 2 is a view in section thereof and Fig. 3 is a similar view of a modified form of my invention.

Similar figures of reference refer to similar parts throughout the drawings.

Referring to Figs. 1 and 2 of the drawings, which show my invention in its preferred form, 1 is a cylindrical casing made of metal or other suitable material, with a top plate 2 and a bottom plate 3 soldered or otherwise firmly secured thereto. This cylindrical casing 1 is divided into two chambers by a partition 4 which is firmly secured by soldering or otherwise to the inner walls of the cylindrical casing 1.

In the upper chamber of the casing is a piston 5 which extends through an aperture in the upper plate 2, up and down through which it freely works, and is provided with a thumb piece 6. The piston 5 carries a piston-head 7, which fits closely in the upper chamber of said cylindrical casing and is provided on its edge where it comes in contact with the inner wall of said cylindrical casing with suitable packing so that air cannot escape around its edge. The piston 5 bears a vent 8 near the thumb-piece which connects with a passage-way extending lengthwise through the piston down to its lower end where the ball-valve 9 is located. The lower chamber of the cylindrical casing is provided with a tube 10 firmly secured at the point 11 to the wall of the cylindrical casing 1 and extending outwardly and then bent downwardly so that the lower open end 12 of said tube is close to the bottom of the cylindrical casing. The upper end of this tube 10 bears immediately against the partition 4 and through said partition 4 and through said tube 10 at the point 13 is a pin-point hole. Immediately beneath this pin-point hole on the under side of said tube 10 is a slightly larger hole 14.

The wall of the cylindrical casing 1 is somewhat thickened at the point 15 in the lower chamber of said casing, so that it will bear screw-threads, and through an aperture formed in said casing at said point is screwed the piece 16, which bears the tube 17 extending some distance into the lower chamber of said cylindrical casing. This piece 16 is in turn screw-threaded so that the pipe 18 may be screwed vertically into it. The pipe 18 passes through the guide 19, which is made onto the upper end of the cylindrical casing 1, and is freely revoluble in said guide 19. The tube 18 is bent at its upper end above the guide 19 in a direction convenient for discharging the spray and bears on its end the mouth-piece 20.

The operation of the atomizer is as follows: The pipe 18 may be unscrewed from the piece 16, which in turn may be unscrewed from the thickened portion 15 of the cylindrical casing 1, the medicament, perfume or other liquid to be vaporized and sprayed may then be inserted through said orifice, sufficient being inserted to cover the lower open end 12 of the tube 10, but not sufficient to cover the opening 14 in said tube. Through this same opening in which the perfume or medicament is inserted soap-suds or water may be inserted for the convenient cleaning of said lower chamber.

When the medicament or perfume is in the lower chamber and the parts have been again adjusted, as the piston 5 is pushed downward the air below the piston-head in the upper chamber of the cylindrical casing is forced through the pin-point orifice 13 and the orifice 14 and the medicament or perfume is drawn up through the tube 10 and discharged as vapor through the hole 14 and thence through the tube 17, the piece 16, the pipe 18 and the mouth-piece 20.

For convenience in carrying the atomizer in the pocket the tube 18 may be partially revolved so that the mouth-piece 20 will be turned toward the piston 5.

It will be readily seen that by this construction a very durable atomizer is formed which is simple in its construction, very convenient for carrying and handling and may be easily cleaned. If the atomizer after the medicament or perfume has been placed in it is upset, the liquid will not run out, as the tube 17 extends so far into the lower chamber that the liquid cannot run out through said tube.

In Fig. 3 of the drawing is shown a modified view of the invention, the only difference being that the piece 16 is fitted immovably to the cylindrical casing 1, and the lower plate 3 is made in the form of a cap screwed to the cylindrical casing. This cap may be removed for the insertion of the perfume or medicament or for the cleaning of the lower chamber.

Having now described my invention what I claim as new and desire to secure by Letters Patent is—

1. An atomizer consisting of a single cylinder divided into two chambers, means for compressing the air in the upper chamber and a tube in the lower chamber opening at one end near the bottom of said chamber and bearing a hole near its other end opening into the upper chamber and a hole oppositely disposed opening into the lower chamber, the wall of said lower chamber being thickened at one point so that a tube may be screwed into it at that point, which in turn connects with another tube extending to a mouth-piece, substantially as described.

2. An atomizer consisting of a single cylinder divided into two chambers, a piston in the upper chamber, means for actuating said piston, a tube in the lower chamber, the lower open end of which opens into said chamber near its bottom and which bears near its upper end a hole opening into the upper chamber and an oppositely disposed hole opening into the lower chamber, the wall of the lower chamber being thickened at one point to adapt a tube to be screwed therein, which in turn is connected by another tube with a mouth-piece, substantially as described.

3. An atomizer consisting of a single cylinder divided into two chambers, a piston in the upper chamber, adapted to admit air to said upper chamber and compress air therein, a tube in the lower chamber, the lower open end of which opens near the bottom of said lower chamber and which at its upper closed end bears a hole opening into said upper chamber and an oppositely disposed hole opening into said lower chamber, the wall of said lower chamber being thickened in one place where a screw-threaded opening is made therein, a tube adapted to be screwed into said opening, another tube screwed into said tube and bearing a mouthpiece, substantially as described.

4. An atomizer consisting of a single cylinder divided into two chambers, means for compressing the air in the upper chamber and a tube in the lower chamber opening at one end near the bottom of said chamber and bearing a hole near its other end opening into the upper chamber and a hole oppositely disposed opening into the lower chamber, a tube secured to the wall of said lower chamber one end of which extends into said lower chamber and the other end of which connects with another tube extending to a mouth-piece, and a cap which screws onto the cylinder at its lower end, substantially as described.

5. An atomizer consisting of a single cylinder divided into two chambers, means for compressing the air in the upper chamber and a tube in the lower chamber opening at one end near the bottom of said chamber and bearing a hole near its other end opening into the upper chamber and a hole oppositely disposed opening into the lower chamber, a tube secured to the wall of said lower chamber one end of which extends into said lower chamber and the other end of which opens into a socket made on the outside of the wall of said lower chamber, another tube which screws into said socket and extends along the outside of the cylinder to a mouth-piece, and a cap which screws onto the cylinder at its lower end, substantially as described.

6. An atomizer consisting of a single cylinder divided into two chambers, means for compressing the air in the upper chamber and a tube in the lower chamber opening at one end near the bottom of said chamber and bearing a hole near its other end opening into the upper chamber and a hole oppositely disposed opening into the lower chamber, a tube rigidly secured to the side wall of said lower chamber, one end of which extends beyond said side wall into said lower chamber, and the other end of which opens into a socket made on the outside of the wall of said lower chamber, another tube which screws into said socket and extends along the outside of the cylinder, through a guide, in which it is revoluble, to a mouth-piece, and a cap which screws onto the lower end of the cylinder, substantially as described.

HARRY H. MALLORY.

Witnesses:
 ANDREW RUTLEDGE, Jr.
 DAVID D. STANSBURY.